United States Patent [19]

Cason et al.

[11] Patent Number: 4,484,302
[45] Date of Patent: Nov. 20, 1984

[54] SINGLE SCREEN DISPLAY SYSTEM WITH MULTIPLE VIRTUAL DISPLAY HAVING PRIORITIZED SERVICE PROGRAMS AND DEDICATED MEMORY STACKS

[75] Inventors: William C. Cason, Austin; Ward A. Kuecker, Round Rock; Paul R. Herrold, Austin, all of Tex.

[73] Assignee: International Business Machines Corporation, Armonk, N.Y.

[21] Appl. No.: 208,817

[22] Filed: Nov. 20, 1980

[51] Int. Cl.$^3$ .......................... G06F 3/14; G06F 9/46
[52] U.S. Cl. .................................. 364/900; 340/721; 340/745; 340/747; 340/799; 364/521
[58] Field of Search ... 364/200 MS File, 900 MS File, 364/518, 521; 340/715, 721, 745, 747, 799

[56] References Cited

U.S. PATENT DOCUMENTS

| | | | |
|---|---|---|---|
| 4,053,946 | 10/1977 | Opittek et al. | 364/200 |
| 4,107,780 | 8/1978 | Grimsdale et al. | 364/521 |
| 4,129,858 | 12/1978 | Hara | 340/324 D |
| 4,197,590 | 4/1980 | Sukonick et al. | 364/900 |
| 4,204,206 | 5/1980 | Bakula et al. | 340/721 |
| 4,257,043 | 3/1981 | Tsuchiko | 340/722 |
| 4,277,835 | 7/1981 | Garziera et al. | 364/900 |
| 4,278,973 | 7/1981 | Hughes et al. | 340/721 |
| 4,296,476 | 10/1981 | Mayer et al. | 364/900 |
| 4,317,114 | 2/1982 | Walker et al. | 340/721 |
| 4,365,314 | 12/1982 | Badagnani et al. | 364/900 |
| 4,404,554 | 9/1983 | Tweedy, Jr. et al. | 340/750 |
| 4,410,957 | 10/1983 | Cason et al. | 364/900 |

OTHER PUBLICATIONS

"Computer Assisted Tracing of Text Evolution" by W. D. Elliott, W. A. Potas and A. van Dam; Nov., 1971.
Brochure advertising "The Electric Blackboard Multi-Window Text Editor" from Santa Cruz Software Services, Publication date unknown.
"Datamation", Feb. 1982 issue, p. 198.

*Primary Examiner*—James D. Thomas
*Assistant Examiner*—A. E. Williams, Jr.
*Attorney, Agent, or Firm*—Harold E. Meier

[57] ABSTRACT

Multiple virtual images are built on a display screen of a text processing system by a display access method (DAM) program running interrupt identified service programs. Each of the service programs is provided with stack memory elements for retaining data to run the program. Each of the service programs is run by the DAM program in accordance with priority interrupts with a higher priority interrupt having immediate access to the DAM program. A service program having a low priority interrupt that is being run by the DAM program will be stopped by the occurrence of a higher priority interrupt with the data and address information of the interrupted program retained in the stack memory elements. The service program of the higher priority interrupt is then run and when ended the DAM program retrieves the data for the lower priority program to return to the point of interruption. This program of the lower priority interrupt is then run to an end if not again interrupted by a higher priority interrupt.

9 Claims, 7 Drawing Figures

SINGLE SCREEN DISPLAY SYSTEM WITH MULTIPLE VIRTUAL DISPLAY HAVING PRIORITIZED SERVICE PROGRAMS AND DEDICATED MEMORY STACKS

BACKGROUND OF THE INVENTION

1. Field of the Invention

This invention relates to multiple virtual displays on a single display screen, and more particularly to multiple virtual displays generated by a reentrant program on identifiable segments of a display screen.

2. Description of Prior Art

Office machines for processing text data to produce hard copies utilize display screens for presenting to an operator visual text as it would appear on hard copy. Typically, such machines incorporate a conventional typewriter keyboard with additional control keys for operator interface with the system controls. The operator keystrokes are displayed on a screen quite similar to a home television receiver screen. This screen either displays a full page of text, a partial page, or in some machines only a single line of text. The display not only provides a visual presentation to the operator of the test being prepared but also provides prompting instructions for the operator of how to interface with the machine.

Responding to the keyboard strokes of an operator are system controls including programmed computers which prepare the text display. Most present day text processing systems include electronics hardware programmed to evaluate the operator keystrokes and to control the display. This electronics hardware includes memory for storing character data and instruction data for future use in editing and the preparation of hard copy. Ease of operation of the machine for the operator is in large part determined by the electronics and the associated computers and programs.

Text processing systems utilizing a display, usually a cathode ray tube, have generally been restricted to a single image on the display screen. Thus, different messages or text presentations to an operator requires that the entire display screen be dedicated to one message or text presentation. This not only affected the efficiency of the operator and slowed down the entire text processing system, it required an operator to remember multiple messages for system operation.

Text processing systems have also been limited by processor operation parameters which defined how different programs were run to generate a display. An interrupt for a particular display is generated but the interrupt may not be serviced because of a prior commitment of the processor to service a presently running program. While the interrupts may be serviced on a priority basis, a higher priority interrupt could not gain access to the processor for operating the program until the processor was free from a presently running program. This limitation was overcome in some text processing systems by utilization of dedicated processors and memory to run in response to an identifiable interrupt. Such a solution, however, requires a considerable amount of hardware thus increasing the system cost and reducing system reliability.

SUMMARY OF THE INVENTION

According to the present invention the display screen of a text processing system is divided into virtual displays each processed independently to provide operator interface to the system. Each virtual display has its own service program and storage area for pointers, parameters and data to be processed. Each service program is run by a display access method (DAM) program using a reentry programming technique. The display access method program runs each of the service programs concurrently based on a priority of interrupts.

Each service program uses the display identified at its reserved position by the first line of its associated virtual display along with the number of lines in the virtual display. In one embodiment of the invention lines 1 and 2 of the actual display screen are a virtual display identifying machine format encoding, page number of the text display, line number of the text being processed, a code identifying the character set in which the machine is operating, and a code identifying the document. The operating display, the usual text display area, identified by lines 3 through 23 is stored as data for the service program of this virtual display. This portion of the total display screen is the working area in which the keystroke information is processed and is usually presented to an operator. In addition to text information, also displayed in lines 3 through 23 is the cursor and areas highlighted by the operator. Line 24 of the total display screen is reserved for a prompt line which is a virtual display providing instructions to an operator on how to interface with the system electronics. Again this virtual display is defined by data in storage for the service program of this virtual display. Line 25 of the total display screen is reserved for presenting messages, for example, errors, exceptions, etc., to an operator. This last line virtual display is also defined by a service program.

In accordance with the present invention, multiple virtual displays are generated on a single display screen in response to a plurality of interrupts selected on a priority basis. In response to a first interrupt calling a service program, message data is provided for a selected virtual display of the single display screen. A second interrupt calls a service program to provide text data for a second virtual display for a second area of the display screen. In response to a third interrupt a service program is called to provide prompting data to a third virtual display on a third area of the display screen. Each of the data blocks including the message data, the text data and the prompt data are buffered to generate the display signals for each of the virtual displays.

Apparatus for providing the multiple virtual displays includes an interrupt arbitrator for selecting one of a plurality of interrupts on a priority basis. These interrupt called service programs are stored in memory for each of the virtual displays identified on the display screen. Connected to each of the service program storage areas is a data storage area containing pointers, parameters, and data to be processed by the service programs. The service programs are run in accordance with display access method programming. Each of the virtual displays also includes a display control block area and a buffer storage area and has access to the display access method programming. The display access method programming services the interrupts on a concurrent basis which causes interrupts of lower priority to be run on a possible discontinuous basis by interrupts of higher priority that gain access to the display access method programming.

BRIEF DESCRIPTION OF THE DRAWINGS

For a more complete understanding of the present invention and the advantages thereof, reference may now be made to the following description taken in conjunction with the accompanying drawings.

Referring to the drawings.

DETAILED DESCRIPTION

Figure 1:
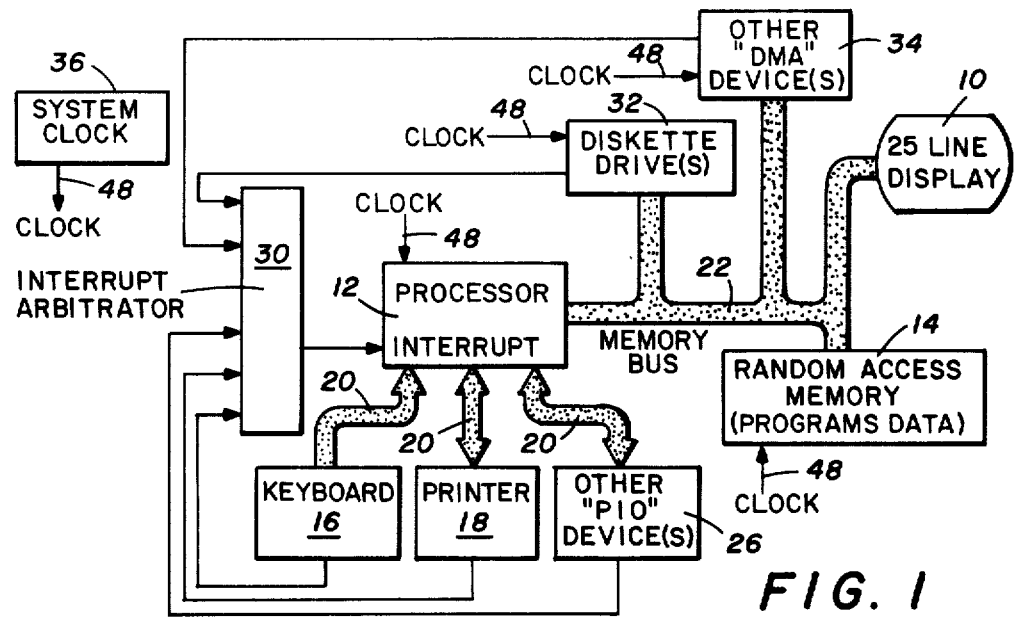
FIG. 1 is a block diagram of a text processing system including an interrupt arbitrator, a data processor, and random access memory for generating virtual displays.

Referring to FIG. 1, there is shown a block diagram of a text processing system for providing a plurality of virtual displays on a twenty-five line display screen 10. Central to the operation of the system is a data processor 12 and a random access memory 14 with the latter providing storage for programs, including program pointers and control data. Providing data to the random access memory 14 to the processor 12 is a keyboard 16 having a conventional alphanumeric section with additional keys for inputting operating instructions into the system. Keystroke data from the keyboard 16 is transferred to the data processor 12 over a bi-directional, input/output, data bus 20 with data transferred between the processor and the random access memory 14 over memory bus 22. Also providing data to the random access memory and receiving data therefrom is a printer 18 which communicates data over the data bus 20. Additional input/output devices 26 are also illustrated in communication with a random access memory 14 through the data processor 12 over the data bus 20. Typically, such additional input/output devices include magnetic card readers and optical code readers. Some of these additional input/output devices require two way communication with the random access memory 14 over the data bus 20 while others provide data only to the random access memory.

Also generated by the keyboard 16, the printer 18 and input/output devices 26 are interrupts connected to an interrupt arbitrator 30. The interrupt arbitrator is a conventional logic chip sometimes known as a multi-level interrupt controller and functions to arbitrate which of the interrupts input thereto has the highest priority. The interrupt selected by the arbitrator 30 is input to the data processor 12 on an interrupt line as a control byte to the random access memory 14.

Additional interrupts input to the arbitrator 30 are from a diskette drive 32 and other direct memory access (DMA) devices 34. Both the diskette drive 32 and the other DMA devices 34 are tied to the memory bus 22 for communication between the data processor 12 and the random access memory 14.

To synchronize operation of the system of FIG. 1 a system clock 36 is provided generating clock pulses to elements of the system as illustrated.

Figure 2:
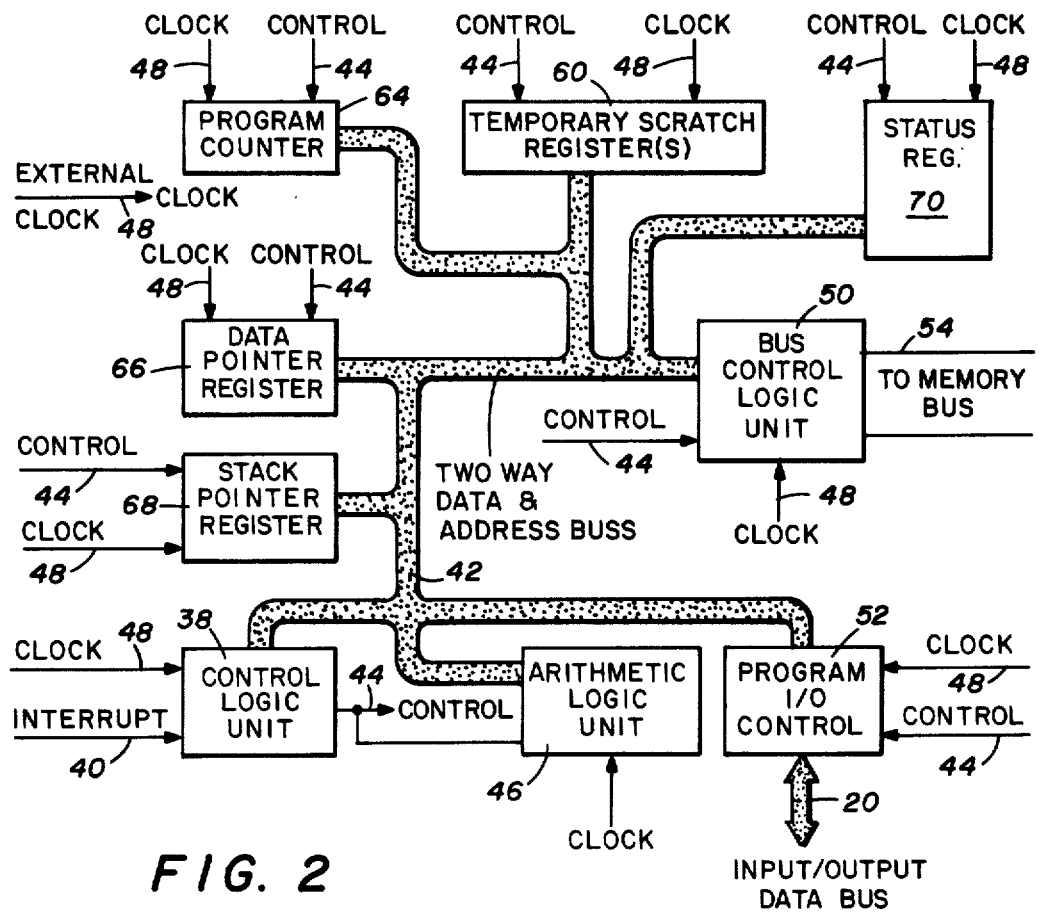
FIG. 2 is a block diagram of the processor of FIG. 1 showing logic in a typical configuration.

Referring to FIG. 2, the data processor 12 is further detailed to show typical logic hardware elements as found in such processors. The processor may be a commercially available unit, such as from Intel Corporation and identified by the Number 8086. Typically the processor includes a control logic unit 38 which responds to interrupts on a device bus 40 from the keyboard 16. The control logic unit 39 is also connected to the data and address bus 42 interconnected to various other logic units of the processor 12.

In response to a fetch instruction from the random access memory, the control logic unit 38 generates control signals to other logic elements of the processor. These control signals are interconnected to the various elements by means of a control line 44 which is illustrated directly connected to an arithmetic logic unit 46 identified as a "control" line 44 to other elements of the processor. Synchronous operation of the control unit 38 with other logic elements of the processor 12 is achieved by means of clock pulses input to the processor from an external clock source. This instruction bus is also shown interconnected to other logic elements of the processor detailed on FIG. 2.

Data and instructions to be processed in the processor 12 are input through a bus control logic unit 50. Data to be processed may also come from program input/output control logic 52. The bus control logic 52 connects storage elements of the random access memory 14 and receives instructions for processing data received from the input/output control 52 or received from the random access memory. Thus, the input/output control 52 receives data from the keyboard 16 or the random access memory 14 while the bus control logic 50 receives instructions and/or data from the same memory. Note that different storage sections of the random access memory are identifiable for instruction storage and data storage.

Device control information from the processor 12 is output through the program input/output controller 52 over a data bus 20. Input data on the data bus 20 from the keyboard 16 is processed internally through the processor by instructions on the bus 42 to the scratch registers 60. The arithmetic logic unit in response to a control signal on line 44 and in accordance with instructions received on the memory bus 20 performs arithmetic computations which may be stored in temporary scratch registers 60. Various other transfers of data between the arithmetic logic unit 46 and other logic elements of the processor are of course possible. Such additional transfers may be to a status register 70, a data pointer register 66 or a stack pointer register 68. Also in the data stream for these various logic elements by means of the bus 42 is a program counter 64.

A particular operating sequence for the processor 12 is determined by instructions and data on the memory bus 22 and input data on the bi-directional bus 20. As an example, in response to received instructions, the processor transfers data stored in the scratch registers 60 to one of the registers 66, 68 or 70. Such operations of the data processor 12 as detailed in FIG. 2 are considered to be well known and understood by one of ordinary skill in the data processing field. A detailed description of each operation of the processor of FIG. 2 for the described invention would be counterproductive to an understanding of the invention as claimed.

Figure 3:
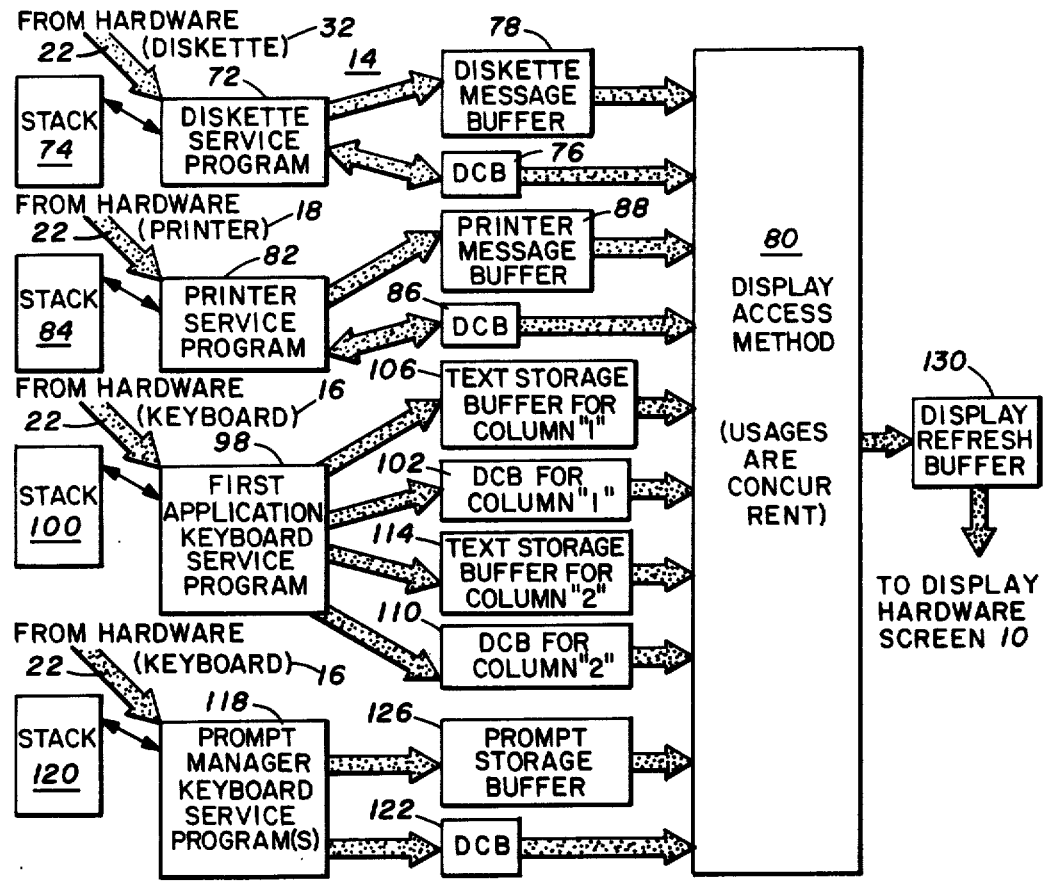
FIG. 3 is a functional layout identifying programs and data in the random access memory of FIG. 1.

Referring to FIG. 3, there is shown a memory format of the random access memory 14 for the text processing system of FIG. 1 to generate multiple virtual displays on the display screen 10. It should be understood that this format illustrates only a typical configuration of the random access memory for providing multiple virtual displays. Each of the hardware devices that generate data for the display screen 10 includes a service program area in the random access memory 14. Data from the diskette is input on the memory bus 22 to a diskette service program area 72 having stack memory elements 74 connected thereto. Stack storage elements are areas of the random access memory dedicated for pointer, control and data storage for an associated service program. Also in communication with the diskette service program 72 is a display control block 76 and a diskette message buffer 78. The display control block 76 provides control commands for operation of the display access method (DAM) program 80 for a particular interrupt and also identifies the particular virtual display to be used by the search routine associated with the service routine which receives the interrupt. The display control block 76 contains commands from the diskette service program 72. The diskette message buffer is a temporary storage register for data to be processed by the DAM program 80 when running a service program.

Data to the printer 18 to be displayed on the screen 10 is transferred over the by-directional input/output bus 20 from a printer service program area 82. The area 82 contains the printer service program and is in communication with a stack memory element 84 containing data for running the printer service program. Also required to run the printer service program is a display control block 86 and a printer message buffer 88 both of which communicate with the DAM program 80.

Continuing, keyboard data is received on the input/output bus 20 from the keyboard 16 and transferred over the memory bus 22 to a text application keyboard service program area 98 in communication with stack memory elements 100. In the embodiment shown, a keyboard service program is stored in the area 98 to service two parallel virtual displays for user data.

To run the text keyboard service program, a display control block 102 provides control commands to the DAM program 80. Data required to run the text keyboard service program for a first of the parallel virtual displays is stored in a text storage buffer 106 providing data to and receiving data from the DAM program 80. Data required to run the text keyboard service program for the second parallel virtual display is stored in a text storage buffer 114 connected to the DAM program 80.

The remaining virtual display on the display screen 10 for the embodiment being described receives operator commands from the keyboard 16 on the memory bus 22 to a prompt manager service program area 118 that includes a prompt manager service program in communication with stack memory elements 120. Commands for running the manager service program are provided to the DAM program 80 from a display control block 122. Data required for running the manager service program is provided to the DAM program 80 from a prompt storage buffer 126.

Each of the stack memory elements 74, 84, 100 and 120 are areas of the random access memory for storing data exclusively for use by its associated service program. It stores the parameters required for operating the service program and enables the DAM program 80 to process the various service programs concurrently by reentry techniques. If a program having a low priority is being processed by the DAM program 80 but a higher priority interrupt occurs, then the current state of the processor 12, that is, the data stored in each of the identified registers of the DAM program, is pushed onto the stack of the lower priority interrupt that was being serviced by the DAM program. This enables the use of a data processor with a finite number of registers and limited arithmetic logic units to service a plurality of programs.

Data for the higher priority interrupt is now removed from its identified stack to set up the processor registers for servicing the higher priority program by the DAM program 80. When the higher priority program interrupt has been completely serviced, as identified by the entering of a "return" call, then the existing data in the stack is discarded and the present state of the registers of the DAM program 80 for the lower priority process is recovered from the associated stack elements. This reinitializes the program counter 64 and the previous service program, the lower priority program that was previously interrupted, is picked up for processing at the occurrence of the higher priority interrupt. Thus, the ability to store the state of a service program being run by the DAM program 80 in stack memory elements enables reentry programming and concurrent running of service programs.

Basically, each of the service programs 72, 82, 98 and 118 and associated parts of the random access memory 14 along with the data processor 12 comprise a separate virtual computer. Each service program when running with the data processor 12 is a virtual computer which can be executed concurrently but not simultaneously because all programs are using the same processor. Thus in the architecture illustrated in FIGS. 2 and 3, each of the different programs shares the processor that has a dedicated area of the random access memory. Each program also shares the display 10 since each looks at its own virtual display.

Display data bytes and control bytes output from the DAM program 80 upon the completion of the processing of each of the service programs is input to a display refresh buffer 130. The display refresh buffer 130 is formatted to run with each virtual image associated with the various service programs. The service programs identify lines on the display screen 10 for the identified virtual display. For example, the diskette service program and the printer service program identify a virtual display to the DAM program 80 consisting of lines 1 and 2, and 25, respectively, of the display screen 10. The text keyboard service program identifies lines 3-23 of the display for two parallel virtual displays on the screen 10 for user data. The number of columns of text in each of these two displays is a variable and is a part of the text service program. The prompt manager keyboard service program identifies line 24 as a virtual display that appears on actual line 24 of the screen 10. The above is based on the assumption that the screen 10 is divided into 25 actual display lines.

Figure 4:
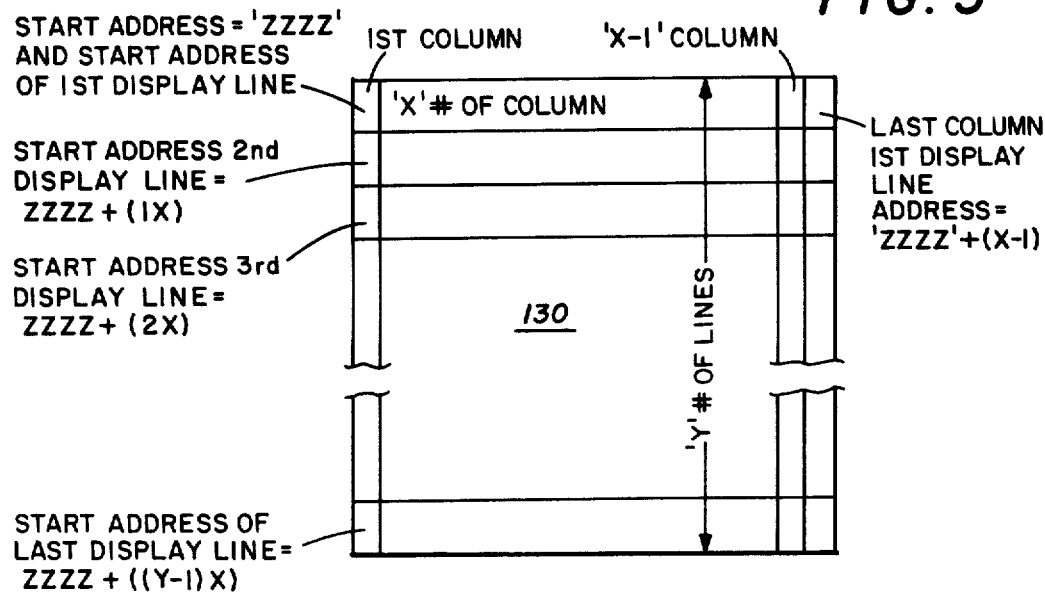
FIG. 4 is an illustration of a functional layout of the refresh buffer for the text processing system of FIG. 1.

Referring to FIG. 4, there is shown a representation of the refresh buffer 130 detailing each of the display lines and columns of displayable positions. Thus a character will be placed in a block on one of the display lines and in one of the columns.

The start address of the refresh buffer for the first character position is given by the code "ZZZZ". This is also the start address of the first display line in the buffer. This also is the first line and first column in which a character may appear on the screen 10. The start of the address on the second display line is given by the code "ZZZZ+(1x)", where x is the number of columns on a line and one signifies one display line below the first line. The start address of the third display line in the buffer 130 is given by the code "ZZZZ+(2x)" and the start address of the last line on the display is identified by the code "ZZZZ+(y−1)x", where y is the number of lines on the display.

Moving in the horizontal direction, the address of the last character position in the first line, that is in the last column, is given by the code "ZZZZ+(x−1)", where x is the number of columns across the buffer and also displayable columns on the display screen 10.

Each of the service programs as illustrated in FIG. 3 calls the character position address for each of the lines identified with its virtual display from its associated stack memory elements. Thus, the diskette service program and the printer service program call from the associated stack memory elements the character address locations for lines 1 and 2, and 25, respectively, of the buffer 130. The text service program calls from the stack memory elements 100 each of the address codes for each of the character positions of lines 3-23 of the buffer. These lines are dedicated to the text service programs and when the DAM program 80 provides data to the buffer 130 from the text service program these address locations are the only ones that wil be considered. It should be again noted that the display area for the text service program is divided into two vertical sections, that is, the first (or left) portion of the buffer 130 is dedicated to a first virtual display and the columns in the second (or right) portion are dedicated to a second virtual display. Thus, the display control block 102 services a number of identified columns on the left portion of the screen 10, and the data control block 110 and the text storage buffer 114 services a number of identified columns on the right portion of the screen. Also when a text service program is called by an interrupt, the DAM program multiplexes the instructions for both sections of the virtual display for text user information.

When the refresh buffer as illustrated in FIG. 4 is serviced from the DAM program 80 display signals are forwarded to the display screen 10 to present each of the virtual images to an operator.

Figures 5, 6A:
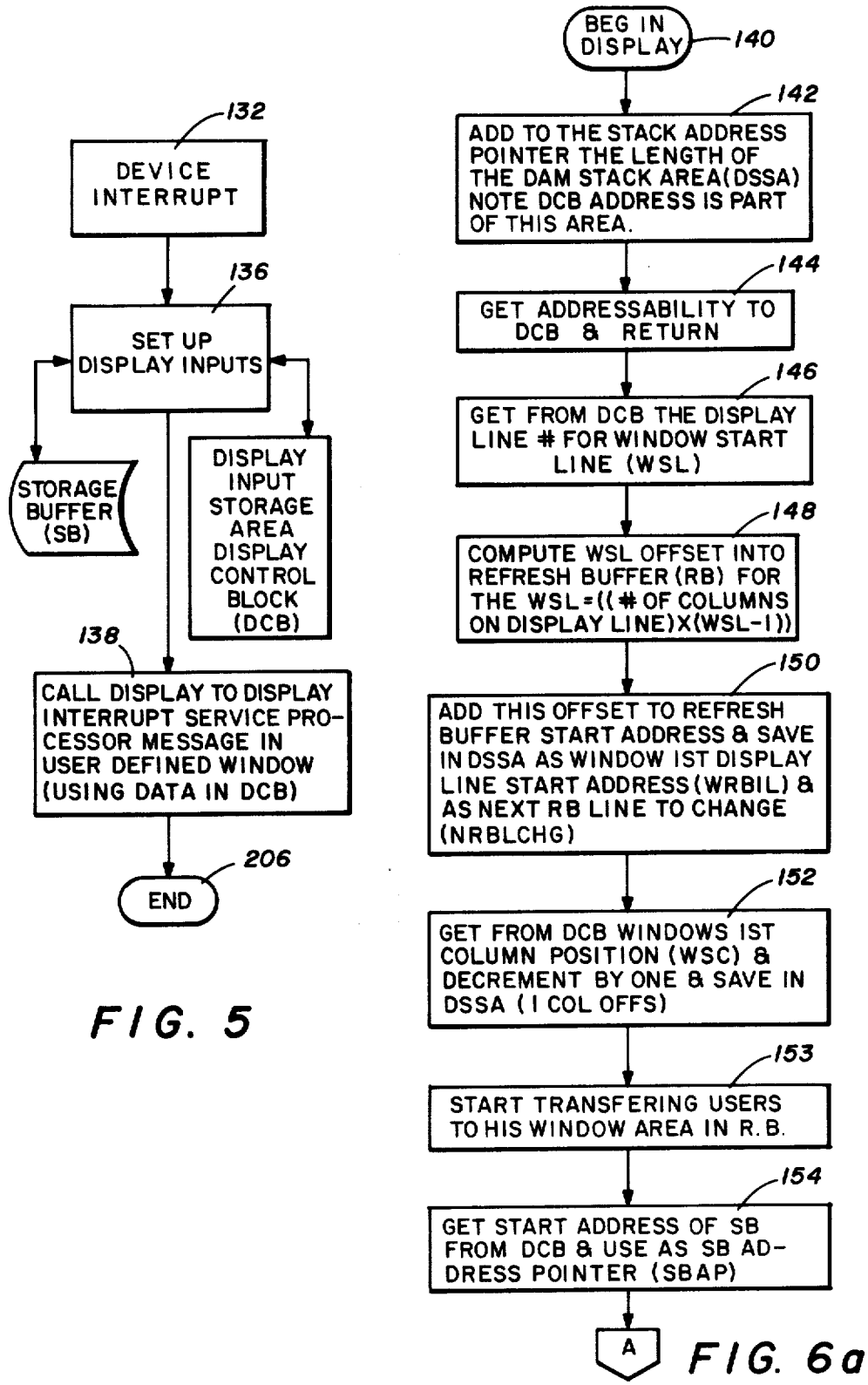
FIG. 5 is a flow chart illustrating an operation for generating virtual displays in predefined window areas of a display screen.
FIGS. 6a and 6b are flow charts illustrating a subroutine called during the running of the routine of FIG. 5 that operates to display user text and user defined windows.

Referring to FIG. 5, there is shown a flow chart illustrating the operation of the DAM program 80 for running each of the service programs 72, 82, 98 or 118 concurrently. An interrupt from one of the input/output devices occurs at sequence 132. A particular service program to be run by the DAM program 80 is identified during sequence 136 to set up the display inputs from the associated storage buffer and the display input storage area of the display control block. For example, if the diskette service program is to run the DAM program 80 then the inputs to set up the display during sequence 136 are placed into the display control block 76 and the diskette message buffer 78 by the diskette interrupt service program.

Input parameters in the display control block include: the display start line of an identified window (WSL), the number of lines in the window (W vert.), that is, the number of lines in the virtual display, the first column position of the window (WSC), and the number of columns in the window (W hor.). In addition, the storage buffer address (SBA) and the length of the storage buffer (SBL) are set up during sequence 136.

With the display inputs set up, the identified interrupt service program advances to call a display subroutine, for example, the diskette subroutine, at call 138 to display text in the defined window, that is the identified virtual display associated with the program being serviced.

Figure 6B:
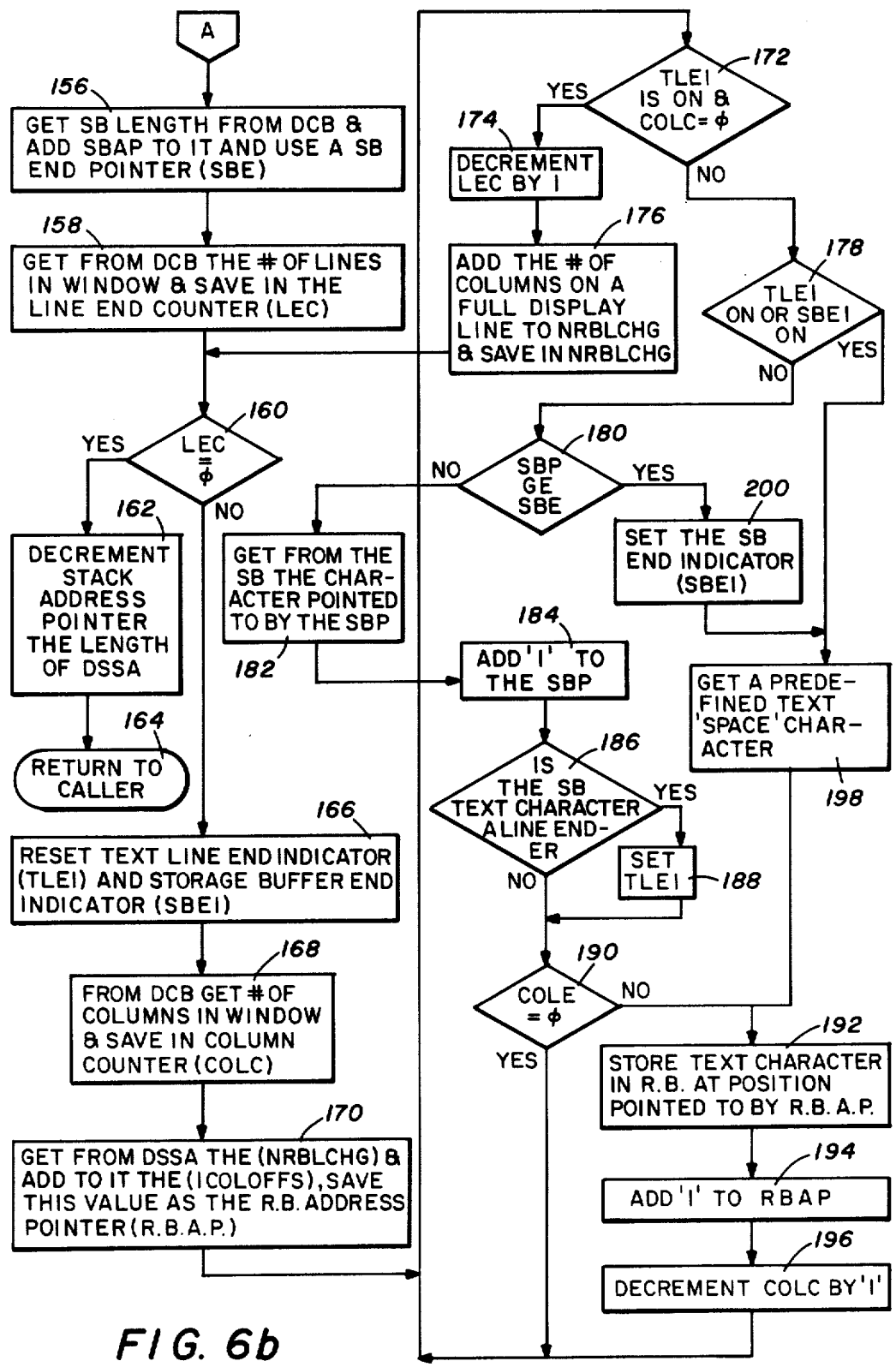

Referring to FIG. 6, the display subroutine which is the DAM program 80 is called from the interrupt service processor at 138 and executed at command 140 and initially adds to the stack address pointer the length of the DAM stack area (DSSA). Note that the address of the data control block for the program being serviced is part of this area. By way of definition, the DAM stack area is a dedicated data section used by the DAM program 80 for storing information to be processed during running of one of the service programs. The content stack address pointer, when called, points to the address of the active display control block.

After completing addition 142 the addressability to the active display control block is retained at sequence 144. Next the display line number for the window start line (WSL) is retrieved from the active display control block at sequence 146. A computation 148 is made to compute the window start line offset in the refresh buffer for the window start line. This is given by the formula: WSL=(number of columns on a display line)×(WSL−1). Next, this offset is added at sequence 150 to the refresh buffer start address and saved in the DAM stack area as the first display line start address of the virtual window (WRBIL). This line is the next refresh buffer line to change as identified by the mnemonic "NRBLCHG". The first column position of the window is then retrieved from the active display control block and decremented by one at sequence 152. This value is saved in the DAM stack area and is a column offset on the first line of the display from the first character display position. For example, the horizontal displacement of the display line start as used when creating the two parallel virtual displays.

Next, the sequence that transfers user text from the active storage buffer begins at sequence 153 to the dedicated window area in the refresh buffer 130. The start address of the active buffer is retrieved at sequence 154 from the active display control block. This start address is used as the start buffer address pointer (SBAP). After retrieving the start address the buffer length is retrieved at sequence 156 from the active display control block and added to the buffer address pointer. This value is used as the storage buffer end pointer (SBEP).

Continuing in the subroutine for developing a display in the refresh buffer 130, the number of lines in an identifiable window (the virtual display) is retrieved from the active display control block at sequence 158 and this value is saved in a line end counter (LEC). A test 160 is then made to determine if the line end counter is equal to zero. If not (LEC=0) the stack address pointer is decremented at sequence 162 to the length of the DAM stack area and the display subroutine is returned to the caller at return 164, which is the routine of FIG. 5.

When the test 160 indicates that the line end counter is not equal to zero (LEC≠0) then the text line end indicator (TLEI) and the storage buffer end indicator (SBEI) are reset at sequence 166 and the number of columns in the active window is retrieved from the active display control block at sequence 168. This value is saved in a column counter (COLC). The next refresh buffer line to be changed is retrieved from the DAM storage area at sequence 170 and added to the column offset. This value is saved as the refresh buffer address pointer in the DAM stack area. A test 172 is made to determine if the text line end indicator is on and the column counter equal to zero. A positive result of this test decrements the line end counter by one at sequence 174 and an addition 176 adds the number of columns on a full display line to the next refresh buffer line to change. The results of this addition is then saved in a DAM area as the next refresh buffer line to change. With the completion of the addition 176 the subroutine of FIG. 6 is recycled to the test 160.

A negative result for the test 172 advances the display subroutine to a test 178 to determine if the text line end indicator (TLEI) is on or if the storage buffer end indicator (SBEI) is on. A negative result at the test 178 advances the subroutine to a test 180 to determine if the storage buffer pointer is greater than or equal to the storage buffer end. If this test is negative then the character pointed to by the buffer pointer (BF) is retrieved from the active buffer at sequence 182 and an addition 184 adds one to the buffer pointer. With one added to the buffer pointer at addition 184 a test 186 is made to determine if the active buffer text character is a line ender. When it is then the text line end indicator is set during sequence 188 and a test 190 is made to determine if the column counter is equal to zero (COLC=0). The test 190 of the column counter is also made when the test 186 produces a negative result.

When the column counter is equal to zero then the display subroutine recycles to the test 172 to determine if the text line end indicator (TLEI) is on and the column counter equal to zero. However, if the column counter is not equal to zero at test 190 then the text character is stored at sequence 192 in the refresh buffer 130 at a position pointed to by the refresh buffer address pointer.

An addition 194 is made to add one to the refresh buffer address pointer and the column count is decremented by one at sequence 196. The display subroutine then recycles to the test 172.

Returning to the test 178 which determines if the text line end indicator is on and the storage buffer indicator is on, a positive result sequences the subroutine to retrieve a predefined text "space" character at sequence 198 and after retrieving this character the sequence advances to the text character store 192.

A negative response to the test 178 and a positive response to the test 180, which determines if the storage buffer pointer is greater than or equal to the buffer end, causes the storage buffer end indicator (SBEI) to be set at sequence 200 and the subroutine advances through sequence 198 to the text character store 192.

The display subroutine recycles through the negative path of the test 172 until the text line end indicator is on and the column counter equals zero. When these conditions exist the sequences 174 and 176 are completed to return the subroutine to the test 160. The positive path from the test 160 will also continue to recycle until the line end counter does equal zero at which time the stack address pointer is decremented by the length of the DAM stack area at sequence 162. This decrementing sequence 162 completes the display subroutine and returns the DAM program 80 to servicing the routine of FIG. 5 and the call 138.

When returning to the interrupt service program 72, 82, 98 or 118 upon completion of the subroutine of FIG. 6, the routine of FIG. 5 steps to an end and the next lower priority interrupt gains control of the DAM program 80.

Because the DAM program 80 is capable of running programs concurrently, if at any time during the running of the program of FIG. 5 or the subroutine of FIG. 6, another interrupt comes in having a higher priority then all of the values, addresses and commands in the DAM stack area will be returned to the stack memory elements for the active service program. The display access method program 80 will then run the service program of the higher priority interrupt until the end or until a still higher priority interrupt occurs.

When a program for a high priority interrupt is run to the end, the data stored in the stack memory elements for the interrupted lower priority program will be retrieved by the display access method program 80 which will then return to running the routine of FIG. 5 of the subroutine of FIG. 6 at that point where the higher priority interrupt occurred. Thus, a low priority interrupt service program may be interrupted several times by a higher priority interrupt before ending at return 206. This is identified as reentry programming inasmuch as the interrupted service program is reentered into the display access method program 80 at a point where the interrupt occurred.

At the end of the routine of FIG. 5 at return 206 the display refresh buffer 130 contains in storage identified with a virutal image the necessary graphic data and control items for building a display on the screen 10. The total display will be a multiplicity of virtual images each built by running of the display access method program 80 with the service programs 72, 82, 98 and 118.

While only one embodiment of the invention, together with modifications thereof, has been described in detail herein and shown in the accompanying drawings, it will be evident that various further modifications are possible without departing from the scope of the invention.

I claim:

1. Apparatus for generating multiple virtual displays on a single display screen, comprising:
    a single processor for controlling the operation of said apparatus,
    a partitioned memory having a plurality of dedicated areas corresponding to a number of multiple virtual displays on the single display screen, each of said dedicated areas including a service program area, a stack element area, a buffer area and a display control block area,
    a display access method program stored in said memory for running a plurality of service programs stored in said service program areas, each of said service programs having an interrupt priority and associated with a separate virtual display on said single display screen, and
    an interrupt arbitrator responsive to an interrupt calling a high priority service program for interrupting the processing by the processor of information on the virtual display associated with a low priority service program, said interrupt initiating the processing by said processor of information on the virtual display associated with said high priority service program.

2. Apparatus for generating multiple virtual displays as set forth in claim 1 wherein said plurality of said service programs include: (1) a diskette service program, (2) a printer service program, (3) a text application keyboard service program, and (4) a prompt manager keyboard service program.

3. Apparatus for generating multiple virtual displays as set forth in claim 2 wherein said dedicated area associated with said text application keyboard service program includes two sections of said buffer area and said display control block area for producing a virtual display with two vertical sections.

4. A method of generating multiple virtual displays on a single display screen utilizing a single processor and a partitioned memory having a plurality of dedicated areas, each dedicated area including a service program area and a stack element area, comprising the steps of:

generating an interrupt from a plurality of interrupts on a priority basis, in response to a first interrupt from the plurality of interrupts, calling and running a first service program for a first selected virtual display on the single display screen, said first service program stored in the service program area of a first dedicated area of said memory, in response to a second interrupt having a higher priority than said first interrupt, interrupting the running of said first service program, storing data generated for said first service program in said stack element area of said first dedicated area of said memory, calling and running a second service program for a second selected virtual display on the single display screen, said second service program stored in the service program area of a second dedicated area of said memory, and buffering output data from each of the service programs called by an interrupt to format a plurality of virtual displays on the single display screen.

5. A method of generating multiple virtual displays as set forth in claim 4 wherein each of said service programs retrieves from its associated stack element a number of display lines and a number of displayable positions for the virtual display defined by the service program.

6. A method of generating multiple virtual displays as set forth in claim 5 wherein the output data is buffered for each virtual display at a predefined address in a refresh buffer.

7. A method of generating multiple virtual displays as set forth in claim 4 including the step of running the called service program by a display access method program responsive concurrently to each of the service programs on an interrupt basis.

8. A method of generating multiple virtual displays as set forth in claim 7 wherein the display access method program receives for the running of each service program (1) a display start line of a virtual display, (2) a number of lines in the virtual display, (3) an address of the character column of the virtual display, (4) a number of character columns in a virtual display, (5) an address of a storage buffer, and (6) a length of the storage buffer.

9. A method for generating multiple virtual images on a single display screen, utilizing a single processor and a partitioned memory having a plurality of dedicated areas, each dedicated area including a service program area and a stack element area, comprising the steps of:

generating an interrupt from a plurality of interrupts on a priority basis, in response to a first interrupt, calling a first service program to provide message data for a first virtual display on the single display screen, said first service program stored in the service program area of a first dedicated area of said memory, in response to a second interrupt, calling a second service program to provide text data for a second virtual display on the display screen, said second service program stored in the service program area of a second dedicated area of said memory, in response to a third interrupt, calling a third service program to provide prompt manager data to a third virtual display on the single display screen, said third service program stored in the service program area of a third dedicated area of said memory, running each of the called service programs by a display access method program to generate outputs for buffering of the message data, text data and prompt manager data, buffering the message data, the text data, and the prompt manager data to generate concurrently a display format for each of the virtual displays on the single display screen, interrupting each of the service programs in the display access method program to call a service program having a higher priority interrupt, and storing a status of an interrupted service program to be reentered when the identifying interrupt has the highest priority, said status of an interrupted service program being stored in the stack element area associated with the interrupted service program.

* * * * *